US009525669B2

(12) United States Patent
Bjorkengren et al.

(10) Patent No.: US 9,525,669 B2
(45) Date of Patent: Dec. 20, 2016

(54) METHOD AND OPPORTUNISTIC SENSING

(71) Applicant: ST-Ericsson SA, Plan-les-Ouates (CH)

(72) Inventors: Ulf Bjorkengren, Bjarred (SE);
Andreas Anyuru, Lund (SE); Benn Porscke, Staffanstorp (SE); Patrik Ryd, Svedala (SE); Mats Fagerstrom, Malmo (SE); Mats Bergstrom, Malmo (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/440,885

(22) PCT Filed: Dec. 5, 2013

(86) PCT No.: PCT/EP2013/075680
§ 371 (c)(1),
(2) Date: May 6, 2015

(87) PCT Pub. No.: WO2014/086930
PCT Pub. Date: Jun. 12, 2014

(65) Prior Publication Data
US 2015/0295900 A1 Oct. 15, 2015

(30) Foreign Application Priority Data

Dec. 6, 2012 (EP) ..................................... 12195856
Aug. 26, 2013 (EP) ..................................... 13181669

(51) Int. Cl.
*H04L 29/06* (2006.01)
*H04L 9/32* (2006.01)
*H04W 4/04* (2009.01)

(52) U.S. Cl.
CPC ......... *H04L 63/0428* (2013.01); *H04L 9/3242* (2013.01); *H04L 63/0421* (2013.01);
(Continued)

(58) Field of Classification Search
CPC ........ H04L 63/08; H04L 63/0428; H04L 9/08; H04L 9/32; H04L 9/3271
(Continued)

(56) References Cited

U.S. PATENT DOCUMENTS 6,976,087 B1 * 12/2005 Westfall .............. H04L 12/5695
370/238
6,983,366 B1 * 1/2006 Huynh .................. H04L 9/0643
713/168

(Continued)

OTHER PUBLICATIONS

Shin, Minho et al., "AnonySense: A system for anonymous opportunistic sensing," Pervasive and Mobile Computing, Elsevier, NL, vol. 7, No. 1, Apr. 1, 2010, pp. 16-30, XP028139512, ISSN: 1574-1192; DOI: 10.1016/J. PMCJ.2010.04.001.*

(Continued)

*Primary Examiner* — Farid Homayounmehr
*Assistant Examiner* — Sanchit Sarker
(74) *Attorney, Agent, or Firm* — Patent Portfolio Builders PLLC

(57) ABSTRACT

A method in a first device for anonymously delivering data to a part that has initiated a task is provided. The first device and the part initiating a task are participants in opportunistic sensing. The method comprises creating a data sample and encrypting the data sample with a public key of the task initiating part. After communicating the protected sample to one or more intermediate devices, one of the one or more intermediate devices delivers the protected sample to the task initiating part, such that the task initiating part does not know the identity of the first device. The task initiating device only know the identity of the one of the one or more intermediate devices that delivered the protected sample to the task initiating part, wherein the intermediate devices are participants in the opportunistic sensing.

17 Claims, 4 Drawing Sheets

(52) U.S. Cl.
CPC ........ *H04L 63/062* (2013.01); *H04L 2209/24* (2013.01); *H04W 4/043* (2013.01)

(58) Field of Classification Search
USPC .......................................................... 713/168
See application file for complete search history.

(56) References Cited

U.S. PATENT DOCUMENTS

| | | | |
|---|---|---|---|
| 7,062,500 B1* | 6/2006 | Hall .................. | G06F 21/10 |
| 7,958,354 B1* | 6/2011 | Davis ................. | H04L 9/085 380/44 |
| 8,553,561 B1* | 10/2013 | Chokshi ............. | H04L 45/125 370/238 |
| 8,850,200 B1* | 9/2014 | Horgan .............. | H04L 63/0428 380/277 |
| 2002/0112187 A1* | 8/2002 | Dalton, Jr. ........ | H04L 29/06027 726/14 |
| 2002/0116382 A1* | 8/2002 | Koyama ............ | H04L 63/0442 |
| 2003/0009660 A1* | 1/2003 | Walker .............. | H04L 63/04 713/153 |
| 2004/0147245 A1* | 7/2004 | Kastelewicz ....... | G06Q 20/04 455/406 |
| 2004/0213266 A1* | 10/2004 | Willhite ............. | H04L 12/5693 370/395.43 |
| 2005/0039034 A1* | 2/2005 | Doyle ................ | H04L 9/0825 713/193 |
| 2006/0179294 A1* | 8/2006 | Chu .................. | G06F 9/4405 713/2 |
| 2007/0268518 A1* | 11/2007 | Yokoyama ......... | G06F 21/608 358/1.15 |
| 2008/0270563 A1* | 10/2008 | Blocksome ......... | G06F 13/28 709/212 |
| 2009/0307029 A1* | 12/2009 | Ramanathan ...... | G06Q 10/00 705/67 |
| 2009/0310819 A1* | 12/2009 | Hatano .............. | G06F 21/6245 382/100 |
| 2009/0320127 A1* | 12/2009 | Hong ................ | H04N 1/00846 726/21 |
| 2010/0103924 A1* | 4/2010 | Rao ................... | H04W 16/14 370/351 |
| 2012/0022741 A1* | 1/2012 | Moore ............... | H04W 8/24 701/31.4 |
| 2013/0091269 A1* | 4/2013 | Zhang ............... | H04L 49/50 709/224 |
| 2013/0238889 A1* | 9/2013 | Fernandez .......... | G06Q 10/30 713/100 |
| 2013/0301631 A1* | 11/2013 | Hegde ............... | H04W 16/14 370/345 |
| 2014/0006797 A1* | 1/2014 | Cordella ............ | G06F 21/64 713/189 |

OTHER PUBLICATIONS

Shin, Minho et al., "AnonySense: A system for anonymous opportunistic sensing," Pervasive and Mobile Computing, Elsevier, NL, vol. 7, No. 1, Apr. 1, 2010, pp. 16-30, XP028139512, ISSN: 1574-1192; DOI 10.1016/J. PMCJ.2010.04.001.*
K. Bauer, D. McCoy, D. Grunwald, T. Kohno, and D. Sicker, "Low-resource routing attacks against tor", WPES '07: Proceedings of the 2007 ACM workshop on Privacy in electronic society, pp. 11-20, New York, NY, USA, 2007.*
International Search Report issued in corresponding International application No. PCT/EP2013/075680, date of mailing of the the report Apr. 9, 2014.
Extended European Search Report issued in corresponding European application No. EP 13 181 669.6, dated Apr. 9, 2014.
Christin, Delphine et al., "A survey on privacy in mobile participatory sensing applications," Journal of Systems & Software, Elsevier, North Holland, New York, NY, US, vol. 84, No. 11, Jun. 29, 2011, pp. 1928-1946, XP028388681, ISSN: 0164-1212; DOI: 10.1016/J.JSS.2011.06.073.
Oualha, Nouha et al., "Sensor and Data Privacy in Industrial Wireless Sensor Networks," IEEE 2011 Conference on Network and Information Systems Security (SAR-SSI), May 18, 2011, pp. 1-8, XP031951334, DOI: 10.1109/SAR-SSI.2011.5931357; ISBN:978-1-4577-0735-3.
Wang, Chih-Jye et al., "Anonymous Sensory Data Collection Approach for Mobile Participatory Sensing," 2012 IEEE 28th International Conference on Data Engineering Workshops (ICDEW), Apr. 1, 2012, pp. 220-227, XP032243361; DOI: 10.1109/ICDEW.2012.78; ISBN: 978-1-4673-1640-8.

* cited by examiner

METHOD AND OPPORTUNISTIC SENSING

TECHNICAL FIELD

Embodiments herein relate to a device and a method therein. In particular, it relates to anonymously delivering data to a part that has initiated a task.

BACKGROUND

Opportunistic sensing relates to changing constellations of wireless sensor nodes that, for a limited amount of time, work together to achieve a common goal. Opportunistic sensing is a concept that telecom industry may be investigating as part of their activities within the Networked Society. An important issue in opportunistic sensing may be how to protect the integrity of participating devices, representing its owners.

One proposed alternative may be to introduce an intermediate communication network that may be trusted not to reveal the identity of the participating devices to the data collectors and/or measurement task initiators. However, this alternative to preserve the integrity of the participants in opportunistic sensing, to introduce a trusted intermediate communication network, adds cost for implementation, may add cost for using it, depending on ownership model, and may be problematic in terms of trust and depending on who owns it.

SUMMARY

An object of embodiments herein is to provide an improved way of protecting the integrity of the participating devices, representing its owners, in opportunistic sensing.

According to a first aspect of embodiments herein the object is achieved by a method in a group of devices for anonymously delivering data from a sampling device to a task initiator is provided. The group of devices is participants in opportunistic sensing. The group of devices comprises at least one device acting as the sampling device, and one or more devices of the group acting as intermediate devices. The task initiator initiates a task, the sampling device creates a data sample related to the initiated task and encrypts the data sample with a public key of the task initiator, whereby a protected sample is obtained. The sampling device communicates the protected sample to one of the one or more intermediate devices, one of the one or more intermediate devices delivers the protected sample to the task initiator. Thereby the task initiator does not know the identity of the sampling device, only the identity of the one of the one or more intermediate devices that delivered the protected sample to the task initiator.

According to a second aspect of embodiments herein, the object is achieved by a device adapted to anonymously deliver data to a part that has initiated a task. The device and the part initiating a task are participants in opportunistic sensing. The device, in a first role, is adapted to act as a sampling device, and, in a second role, is adapted to act as an intermediate device, and, in a third role, is adapted to act as a delivering device. The device comprises a creating unit adapted to create a data sample when the device act as the sampling device, an encryption unit adapted to encrypt the data sample with a public key of the task initiator when the device acts as the sampling device. The device, when acting as the sampling device, is further adapted to communicate a protected data sample to one of one or more devices acting as intermediate devices, and the device, when acting as the intermediate device is adapted to deliver a protected data sample to another intermediate device, and, when acting as the delivering device, is adapted to deliver the protected data sample to the task initiating part without revealing the identity of a device acting as the sampling device.

BRIEF DESCRIPTION OF THE DRAWINGS

Examples of embodiments herein are described in more detail with reference to attached drawings in which.

DETAILED DESCRIPTION

According to embodiments herein, participant integrity is achieved by having the participants communicating data, e.g. by sending, receiving, exchanging and forwarding sample data, one or more times before uploading it to a part initiating a measurement task.

As sample data does not comprise any direct information about the identity of the device participant collecting it, the end receiver of the data does not know the identity of the data originator, only the identity of the device that was the "messenger" delivering it on the "last stretch of the relay".

In other embodiments, a computer program product for compiling code for a multi-processor system comprises a computer readable storage medium having computer readable program code embodied therein, the computer readable program code being configured to carry out one or more of the method described herein.

Embodiments herein will be exemplified in the following detailed non-limiting description. Embodiments herein propose that devices exchange sample data with each other before it may be communicated to data collectors, and that the samples do not contain any device identity that may be read, deciphered, by the data collector.

Figure 1:
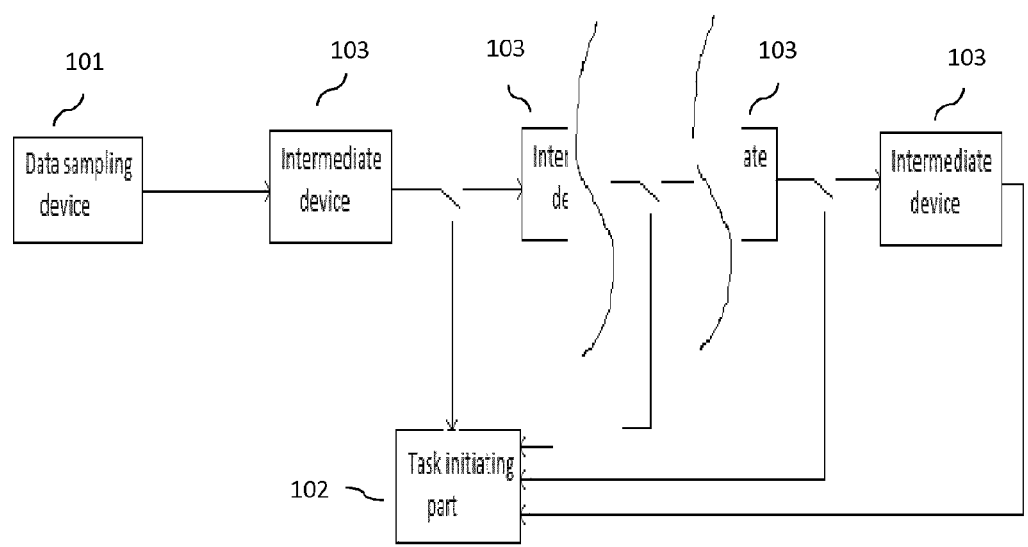
FIG. 1 is an overview showing parts in opportunistic sensing.

Some embodiments are now described with reference to FIG. 1. A first device 101 adapted to anonymously delivering data to a part 102 that has initiated a task is provided. The first device 101 and the part 102 initiating a task are participants in opportunistic sensing. Opportunistic sensing means changing constellations of participants that, for a limited amount of time, work together to achieve a common goal. The first device 101 comprises means for creating a data sample and means for encrypting the data sample with a public key of the task initiator. After communicating the protected sample to one or more intermediate devices 103, one of the one or more intermediate devices 103 delivers the protected sample to the task initiator 102. This is performed such that the task initiator 102 does not know the identity of the first device 101, only the identity of the one of the one or more intermediate devices 103 that delivered the protected sample to the task initiator. Thus, the intermediate devices 103 are participants in the opportunistic sensing.

The first device 101, the part 102 and the intermediate devices 103 may e.g. be a user equipment, a wireless device, a mobile terminal or a wireless terminal, a mobile phone, a computer such as e.g. a laptop, a Personal Digital Assistants (PDAs or a tablet computer, sometimes referred to as a surf plate, with wireless capability, or any other device suitable for opportunistic sensing.

Figure 2:
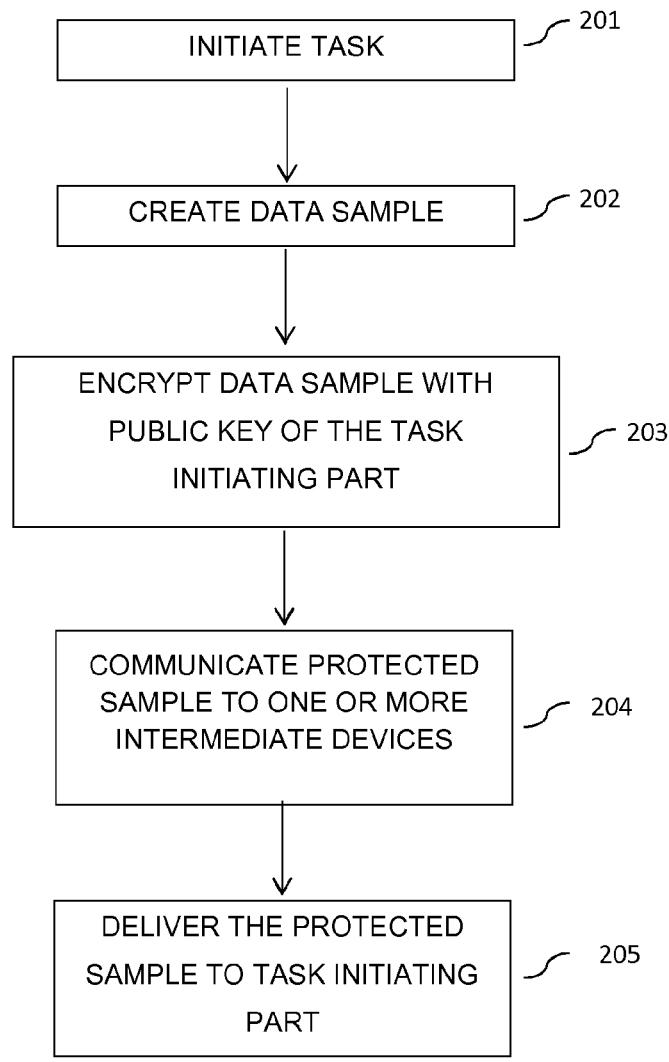
FIG. 2 is a flow chart for methods herein.

With reference to FIG. 2, a method in a first device 101 for anonymously delivering data will now be described.

Action 201

The part 102 initiates a task, such as e.g. a measurements task, in action 201. The first device 101 and the part 102 initiating the task are participants in opportunistic sensing.

Action 202

In action 202, the first device 101 creates a data sample related to the task. The first device may create the data sample according to a format defined in the task by the task initiator 102 in the description of the task. The created sample data format, may comprise e.g. position data, date and time for sample generation, the actual sensor data, and possibly other data related to the task.

Action 203

The first device 101 encrypts the data sample with a public key of the task initiator 102. This means that only the task initiator 102 can decrypt the data, not any of the intermediate devices 103.

Action 204

In action 204 the first device 101 communicates the protected sample to one or more intermediate devices 103 also being participants in opportunistic sensing. For example, the first device 101 may now contact another device among the intermediate devices 103 and communicate the sample to the other device. A similarly generated data sample may be received by the first device 101 from that other device. The data samples do not have to be part of the same measurement task. The first device 101 and the other device may authenticate mutually, and the protocol used will make it non-repudiable for both devices. I.e. if one device later may be accused for delivering corrupt data, it has the possibility to prove which device delivered it to it.

In this action of communicating 204, the protected sample may be exchanged with or sent to a plurality of intermediate devices 103. Thus, the sample data may be exchanged between a plurality of intermediate devices, following the same protocol. In this action of communicating 204, the protected sample may thus be exchanged a plurality of times and thus the sample is sent a plurality of times to different devices among the intermediate devices 103 and will in the end be delivered to the task initiator according to Action 205 below.

Action 205

As mentioned above, one of the one or more intermediate devices 103 delivers the protected sample to the task initiator 102. The sample data may be exchanged one or more times, before one of the intermediate devices 103 delivers 205 the data to the task initiator 102. This communication may be done with mutual authentication, and non-repudiation. The protocol may comprise a part to ensure that the delivering device gets paid for the data, either by receiving a token that may later be redeemed, or that an account of the device receives the payment.

Thereby, the sample is delivered such that the task initiator 102 does not know the identity of the first device 101. The task initiator only knows the identity of the one of the one or more intermediate devices 103 that delivered the protected sample to the task initiator, wherein the intermediate devices 103 are participants in the opportunistic sensing. Thus, the delivering device in turn only knows the identity of the one of the one or more intermediate devices 103 from which it received the protected sample, and so on.

Figure 3:
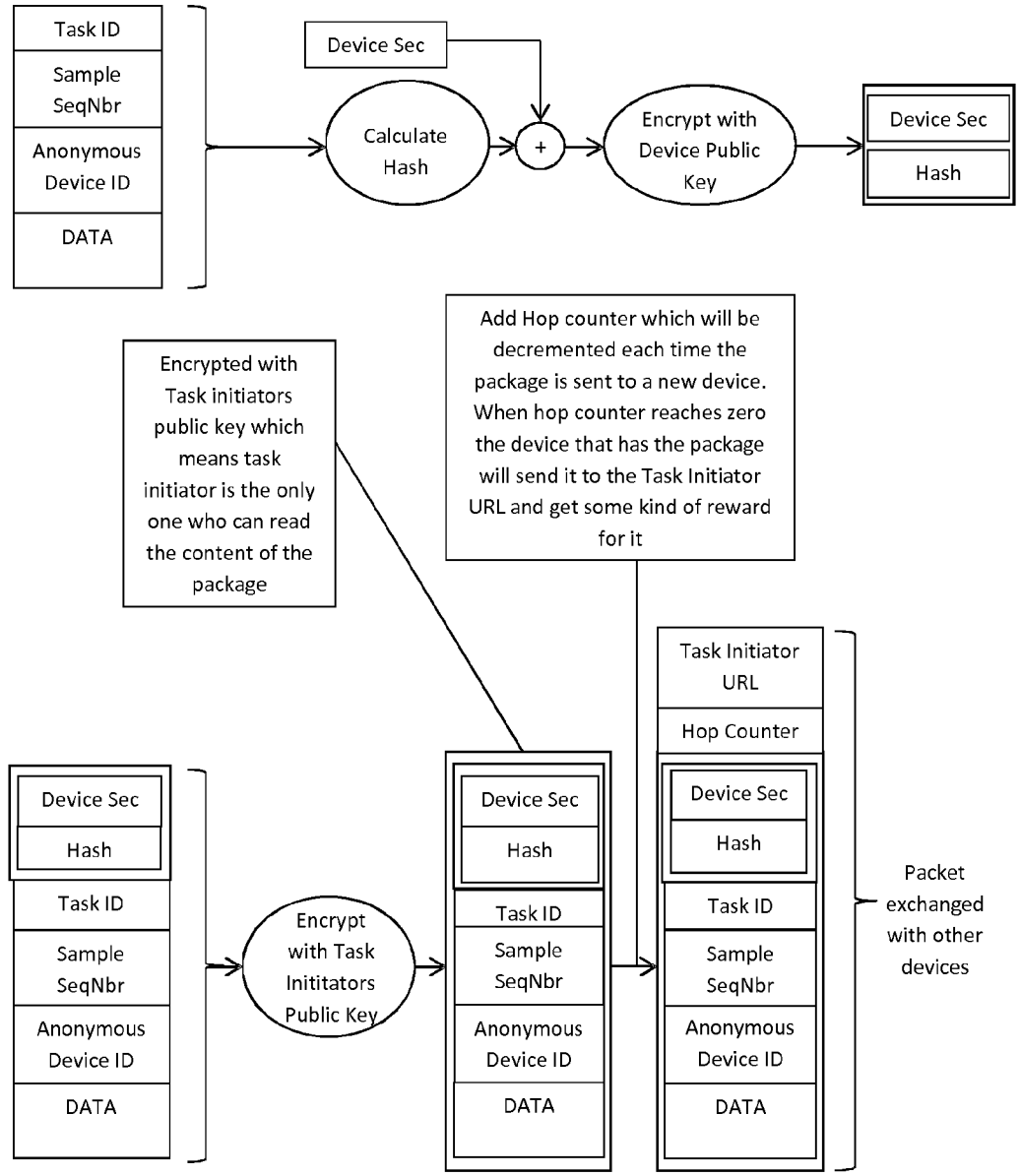
FIG. 3 is a detailed flow chart for methods herein.

According to some embodiments herein, a hop counter may be added to the protected data sample. Thus, a hop counter may be used as seen in FIG. 3, and may be decremented by one in each exchange, and reaches zero before it may be passed to the task initiator part 102. The task initiator part 102 may be found through a Task Initiator URL that may be available outside the encrypted package.

The sample received by the task initiator part 102, or by a representative for many tasks/the entire opportunistic sensing ecosystem, may after decryption with the private key used in this domain be identified by the task id, and also by an anonymous device id, generated randomly by the device for its participation in this measurement task. Thus, methods herein may comprise encrypting the protected data sample together with an anonymous device identity.

There may also be a sequence number to make it possible to order the samples having the same anonymous device id. Thus, embodiments herein may comprise encrypting the protected data sample together with a sequence number, SeqNbr in FIG. 3.

The sample data format, which was defined by the task initiator part 102 in the description of the measurement task, may contain e.g. position data, date and time for sample generation, the actual sensor data, and possibly other data, which the task initiator part 102 now may use for its purposes.

Simplified, all samples may be approximated to have the same value, and a sample may therefore be exchanged against any other sample. For real world scenarios where samples may have different values, the following alternatives may be possible.

One alternative may be to create different "value domains", basically running different parallel eco systems. Within each such eco system the sample values are approximated to the same, but it differs compared to another such eco system.

Another alternative may be that the first device 101, creates samples that are more valuable than other samples in the eco system it may be belonging to, and takes a decision to send the samples directly to the task initiator part 102, so that it gets a reward for the sample itself. The latter would of course lower the integrity protection provided by the eco system, the task initiator part 102 may have an easier job to guess that the data actually originates from the first device 101.

In the case of small variations of sample value it may be acceptable for participating devices to exchange with other samples, the statistical averaging would lead to a fair share of the sample reimbursement over longer periods with participation in different measurement tasks with different sample values.

If the task initiator part 102 would be interested to know the real identity of the first device 101 generating the data series it may publish the task id and the anonymous device id, together with information about the reward it may be prepared to pay for this information. The first device 101 recognizing the task id and the anonymous device id it used in its participation for this measurement task, may contact the task initiator 102 saying that it want to try a challenge related to data from this task.

The protocol may be non-repudiable for the task initiator part 102 once it acknowledges this request. The first device 101 then informs which anonymous device id it wants to be challenged on, and the task initiator part 102 then sends it the sample part containing the hash of the sample data, that was encrypted by the device public key. The first device 101 decrypts it, and returns the hash to the task initiator part 102, sent over a protected channel. If the hash matches the hash calculated by the task initiator part 102 on the actual sample data, then it may be proved that it was this first device 101 that generated the sample series, and payment to the first device 101 for revealing its identity may be executed. The reason for concatenating a device secret with the sample hash before encrypting it with the device public key was to prevent the possibility for the task initiator 102 to reveal the device identity by encrypting the sample hash with different device public keys, and matching it with the corresponding data in the sample message.

An alternative to how a task initiator part 102 may get devices to enroll in the measurement task without revealing their identity may look as follows.

The task initiator part 102 publishes on the web, information about the measurement task, including task id, required sample data format, measurement period, measurement frequency, payment for participation, etc. A device such as the first device 101, or rather its user, that accepts the terms just simply produces a "dummy" sample containing no sensor data, and, most likely, produced outside the requested measurement period. The first device 101 to create the samples within the specified task, may be selected by that the task initiator part 102 in advance publishes information about the task, and that a device accept terms for the task by producing a "dummy" sample containing no sensor data that is exchanged, and received by the task initiator part 102. The sample may be exchanged as any other sample, and ultimately may be received by the task initiator part 102. The task initiator part 102 will then publish all received anonymous device ids on its web page before the measurement period begins, up until the number of participating devices that it want in its measurement task. The devices that sent a dummy sample associated to this task may then check that their anonymous device id may be present on the participant list before the measurement period begins. If the device fills the dummy sample with random data, and some parameter to signal it may be dummy, then this dummy sample may be used to clarify which device was the real one being accepted into the measurement task, if a dispute would arise, following the same challenge procedure as when proving to be the originator of "real" data.

An alternative to how a device/participant may find other devices for exchange of sample data may look as follows.

A device such as the first device 101 keeps a list in the form of a First In First Out (FIFO) with X different device addresses that are possible sample exchange recipients. Thus may, in the action 204, the one or more intermediate devices 103 be selected from a FIFO list kept in the first device 101. The list may initially be populated using ad-hoc methods by the phone user—friends, such as first device 101 user— friends, friends to friends, via contacts on social media, etc. Thus, the FIFO list may comprise devices listed by using ad-hoc methods by the user of the first device 101. The FIFO list may be a list initially published by the part initiating a task 102. One general method may be that the task initiator part 102 publishes an extensive list of devices comprising the first device 101 and the intermediated devices 103, registered to the eco system, from which a device such as the first device 101 may download a randomly picked set. Then, in every sample exchange there may be also an exchange of one recipient address. Thus, in the action of exchanging, there may be an exchange of at least one recipient address. An address to send as exchange may be randomly selected from the FIFO list, thus the address to send as exchange may be randomly selected from the FIFO.

If the address received in the exchange of at least one recipient address is not present in the FIFO list, the method may comprise inserting the address in the FIFO list, whereby the oldest list member is pushed off the FIFO list. If it may be on the list, the oldest may be removed and inserted again, making it the newest in the FIFO. Thus, if the address received in the exchange of at least one recipient address is a member of the FIFO list, the method may comprises removing the at least one recipient address from the FIFO list, re-inserting the at least one recipient address in the FIFO list, whereby the at least one recipient address will be the newest member of the FIFO list.

The device selected for sample exchange may be the oldest in the FIFO (at the FIFO output). Thus, the at least one intermediate device selected for sample exchange may be the oldest member of the FIFO list.

If the address received in the exchange may be not on the list, it may be inserted in the FIFO, which then pushes the oldest off the FIFO.

When an address has circulated in the FIFO X rounds, either the device automatically downloads a new device address from the list published by the task initiator part 102, or the user may be notified and requested to provide a new address using an ad-hoc method.

For the phone to participate in the eco system the FIFO must be provided with addresses, but how these are obtained does not have to be specified in more details than mentioned above.

Using undefined methods makes it more probable that a multitude of methods are selected by different participants, thereby making it harder for anyone trying to hack the anonymous-protection of the system.

In other embodiments, the device may comprise a First In First Out, FIFO, list from which list the one or more intermediate devices 103 are selected from.

In still other embodiments herein, a computer program product for compiling code for a multi-processor system is provided. The computer program product comprises a computer readable storage medium having computer readable program code embodied therein, the computer readable program code being configured to carry out one or more of the methods described herein.

In an exemplified embodiment, the first device 101 that participates in a measurement task creates a sample, called DATA in FIG. 3. It concatenates the DATA with an anonymous device Id, a Sample Sequence Number (Nbr) and the Task Id and then generates the hash of all this data. Then the hash may be encrypted, concatenated with a device secret. Thus, in methods described herein a hash and device secret encrypted with the device public key may be added to a sample. The encrypted data may be then concatenated (e.g. in an xml format) with the sample data, and all of it may be encrypted with the public key of the task initiator part 102, referring to FIG. 3. The data may be now confidentially protected, and only accessible by the task initiator part 102, and the identity of the data may not be revealed by the task initiator part 102. It may be however possible for the device creating the data to prove that it may be the creator, since it may be only this device that may decrypt the package containing the hash and the device secret, as may be seen in FIG. 3. Thus, methods herein may comprise proving the identity of the first device 101 creating the protected sample by using the encrypted hash and device secret.

Figure 4:
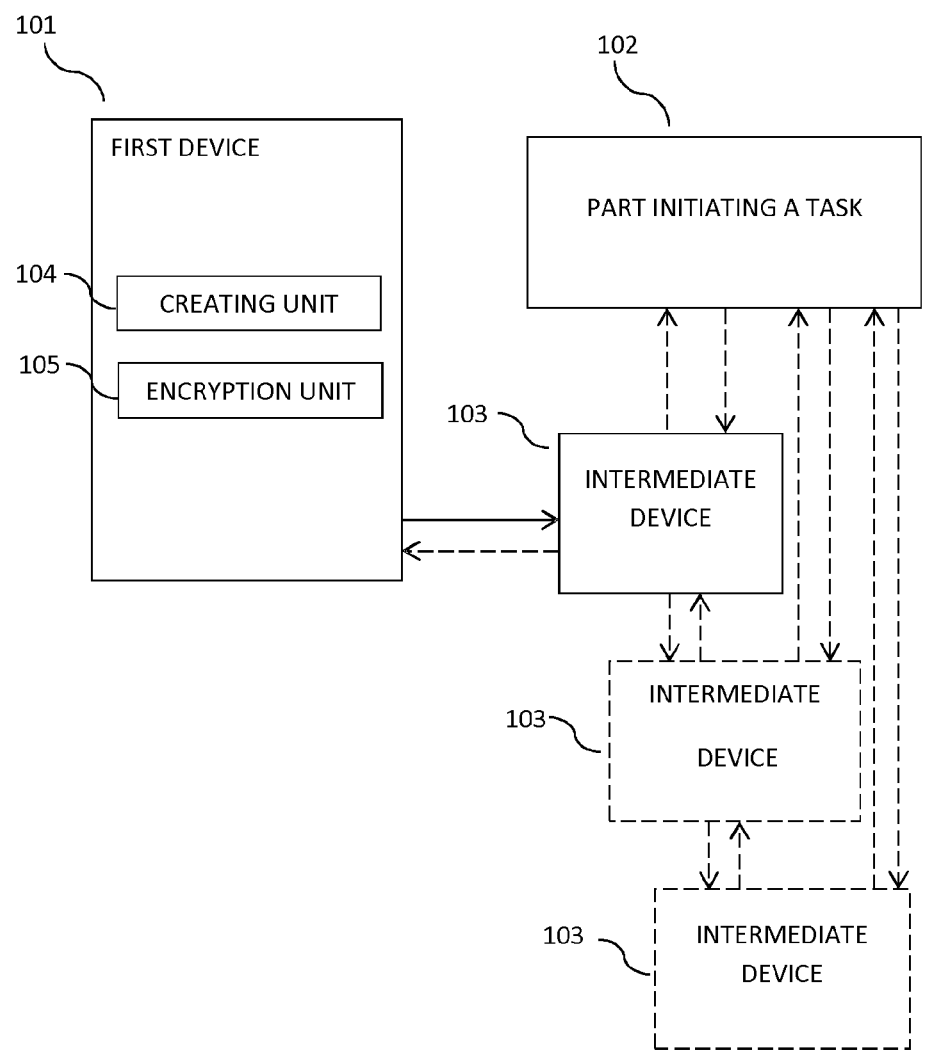
FIG. 4 is a block diagram of embodiments herein.

FIG. 4 is a block diagram showing embodiments herein. A first device 101 is adapted to anonymously delivering data to a part 102 that has initiated a task. The first device 101 and the part 102 initiating a task are participants in opportunistic sensing. The device comprises a creating unit 104 configured to create a data sample and an encryption unit 105 configured to encrypt the data sample with a public key of the task initiator. The first device is adapted to communicate the protected sample to one or more intermediate devices 103, one of the one or more intermediate devices 103 being adapted to deliver the protected sample to the task initiator 102, such that the task initiator 102 does not know the identity of the first device 101, only the identity of the one of the one or more intermediate devices 103 that delivered the protected sample to the task initiator. The intermediate devices 103 are participants in the opportunistic sensing.

An advantage with embodiments herein is that the existing integrity problem in opportunistic sensing is dealt with. Further, no extra layers of trusted nodes are required. Still further, the same concept for anonymously delivering data may also be used for anonymously registering with the initiator part 102 of a measurement task. Methods herein let the users of the devices select to identify themselves as the originators of the samples. This may give the task initiator part 102 a possibility to get extra information about the "real identity" of the device and then reward a person that agrees to reveal her real identity. But this may only happen if the device, the user, accepts to do so.

When using the word "comprise" or "comprising" it shall be interpreted as non-limiting, in the meaning of consist at least of.

The embodiments herein are not limited to the above described examples. Various alternatives, modifications and equivalents may be used. Therefore, embodiments herein should not be limited to the specific form set forth herein. Embodiments herein may be limited only by the appended claims and other embodiments than the mentioned above are equally possible within the scope of the claims.

The invention claimed is:

1. A method in a group of devices for anonymously delivering data from a sampling device to a task initiator, the group of devices comprising at least one device acting as the sampling device, and one or more devices acting as intermediate devices, the method comprising:
   the task initiator initiating a task,
   the sampling device
      creating a data sample related to the initiated task,
      calculating a hash based on at least the data sample,
      encrypting the hash with a public key of the sampling device,
      encrypting the created data sample and the encrypted hash with a public key of the task initiator to produce a protected sample, and
      communicating the protected sample to one of the one or more intermediate devices,
   one of the one or more intermediate devices delivering the protected sample to the task initiator, such that the task initiator does not know the identity of the sampling device, and only the identity of said one of the one or more intermediate devices that delivered the protected sample to the task initiator,
   wherein the group of devices are participants in opportunistic sensing.

2. The method according to claim 1, wherein the communicating comprises exchanging the protected sample one or more times.

3. The method according to claim 1, wherein, the one or more intermediate devices to communicate the protected sample to are selected from a First In First Out, FIFO, list of devices kept in the sampling device.

4. The method according to claim 1, wherein the devices to participate in the task accepts the task by that the task initiator in advance publishes information about the task, and that a device accept terms for the task by producing a "dummy" sample containing no sensor data that is exchanged, and received by the task initiator.

5. The method according to claim 1 wherein the communicating comprises an exchange of at least one recipient address.

6. The method according to claim 1, wherein the hash is encrypted with the public key of the sampling device along with a device secret.

7. The method according to claim 6, further comprising proving the identity of the sampling device creating the sample by decrypting the hash and device secret with a private key of the sampling device.

8. The method according to claim 1, wherein the encrypting further comprises encrypting the data sample together with an anonymous device identity with the public key of the task initiator.

9. The method according to claim 1, wherein the encrypting further comprises encrypting the data sample together with a sequence number with the public key of the task initiator.

10. The method according to claim 1, further comprising adding to the data sample a hop counter.

11. The method according to claim 1, further comprising adding to the data sample a Task Initiator URL to where the data finally will be delivered.

12. The method of claim 1, wherein the protected data sample includes a hop counter that is decremented by each of the intermediate devices involved in delivering the protected sample and the protected data sample is not delivered to the task initiator until the hop counter reaches zero.

13. The method of claim 1, wherein the protected sample is delivered from the sampling device to the task initiator via a plurality of the one or more intermediate devices, and when the protected sample is transmitted from a first one of the one or more intermediate devices to a second one of the one or more intermediate devices the first and second of the one or more intermediate devices exchange an address of another one of the one or more intermediate devices.

14. A multiprocessor system for anonymously delivering data from a sampling device to a task initiator, the system comprising:
   a task initiator comprising a processor executing a computer program stored on a non-transitory computer readable storage medium, which causes the processor to initiate a task, and
   a group of devices being participants in opportunistic sensing, wherein the group comprises:
      at least one sampling device comprising a processor executing a computer program stored on a non-transitory computer readable storage medium, which causes the processor to create a data sample, calculate a hash based on at least the data sample, encrypt the hash with a public key of the sampling device, encrypt the data sample and the encrypted hash with a public key of the task initiator to produce a protected sample, and communicate the protected sample to one or more devices acting as intermediate devices, and
      one or more intermediate devices, each comprising a processor executing a computer program stored on a non-transitory computer readable storage medium, which causes the processor to deliver the protected sample to the task initiator,
   wherein the task initiating part does not know the identity of the sampling device, only the identity of the device acting as delivering device delivering the protected sample to the task initiating part.

15. A non-transitory computer readable storage medium having computer readable program code embodied therein, wherein execution of the computer readable program code by processors in a multiprocessor system causes the processors to execute a method in a group of devices for anonymously delivering data from a sampling device to a task initiator, the group of devices comprising at least one device acting as the sampling device, and one or more devices acting as intermediate devices, the method comprising:

the task initiator initiating a task,
    the sampling device
        creating a data sample related to the initiated task,
        calculating a hash based on at least the data sample,
        encrypting the hash with a public key of the sampling device,
        encrypting the created data sample and the encrypted hash with a public key of the task initiator to produce a protected sample, and
        communicating the protected sample to one of the one or more intermediate devices,
    one of the one or more intermediate devices delivering the protected sample to the task initiator, such that the task initiator does not know the identity of the sampling device, and only the identity of said one of the one or more intermediate devices that delivered the protected sample to the task initiator.

16. The system of claim 14, wherein the protected data sample includes a hop counter that is decremented by each of the intermediate devices involved in delivering the protected sample and the protected data sample is not delivered to the task initiator until the hop counter reaches zero.

17. The non-transitory computer readable storage medium of claim 15, wherein the protected data sample includes a hop counter that is decremented by each of the intermediate devices involved in delivering the protected sample and the protected data sample is not delivered to the task initiator until the hop counter reaches zero.

* * * * *